Figure 1:
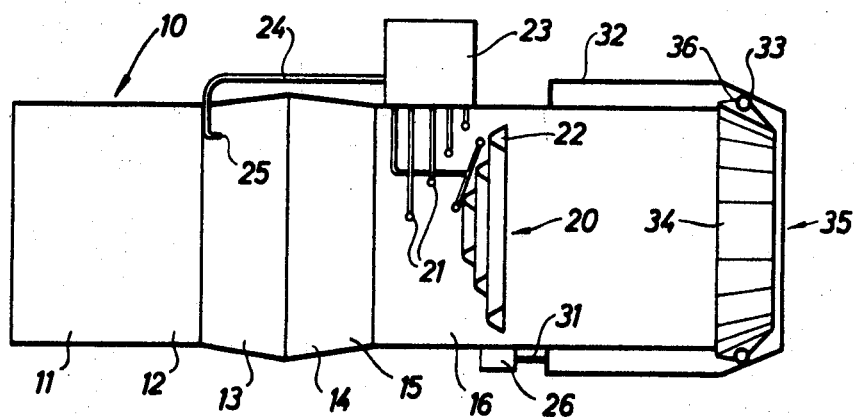

United States Patent

[11] 3,604,210

| [72] | Inventor | Christopher Linley Johnson |
| | | Derby, England |
| [21] | Appl. No. | 850,446 |
| [22] | Filed | Aug. 15, 1969 |
| [45] | Patented | Sept. 14, 1971 |
| [73] | Assignee | Rolls-Royce Limited |
| | | Derby, England |
| [32] | Priority | Aug. 30, 1968 |
| [33] | | Great Britain |
| [31] | | 41555/68 |

[54] GAS TURBINE ENGINE
10 Claims, 3 Drawing Figs.

[52] U.S. Cl. .................................................. 60/237,
60/241, 60/242
[51] Int. Cl. ................................................ F02k 1/16,
F02k 1/18, F02k 3/10
[50] Field of Search ............................................. 60/235,
237, 241, 242, 243

[56] References Cited
UNITED STATES PATENTS

| 2,780,054 | 2/1957 | Coar et al. .................... | 60/242 X |
| 2,818,703 | 1/1958 | Victor ........................... | 60/235 |
| 2,924,933 | 2/1960 | Grube et al. .................. | 60/242 |
| 2,936,581 | 5/1960 | Williams ....................... | 60/242 |
| 2,987,877 | 6/1961 | Torell ............................ | 60/242 X |
| 3,014,676 | 12/1961 | Arnett et al. .................. | 60/237 X |
| 3,016,696 | 1/1962 | Bryant .......................... | 60/242 |
| 3,293,856 | 12/1966 | Tyler ............................. | 60/237 |
| 3,505,818 | 4/1970 | Cross et al. ................... | 60/242 |

Primary Examiner—Al Lawrence Smith
Attorney—Cushman, Darby & Cushman

ABSTRACT: The invention concerns a gas turbine engine having a jet pipe which is provided with reheat combustion equipment and with a variable area nozzle, a pressure-responsive device which controls the area of the nozzle during reheat operation of the engine and which is adjusted in functional dependence upon the value of the jet pipe pressure, fuel supply control means for controlling the supply of fuel to the reheat combustion equipment, a manually operable member for adjusting the quantity of fuel supplied by the fuel supply control means, and biassing means, operated on adjustment of the manually operable member to select and increase reheat, for biassing the pressure-responsive device so that the latter initially adjusts the area of the nozzle at a rate at least sufficient to prevent an appreciable rise of jet pipe pressure.

PATENTED SEP 14 1971

3,604,210

SHEET 1 OF 3

CHRISTOPHER LINLEY JOHNSON

By:
Cushman, Darby & Cushman
Attorneys

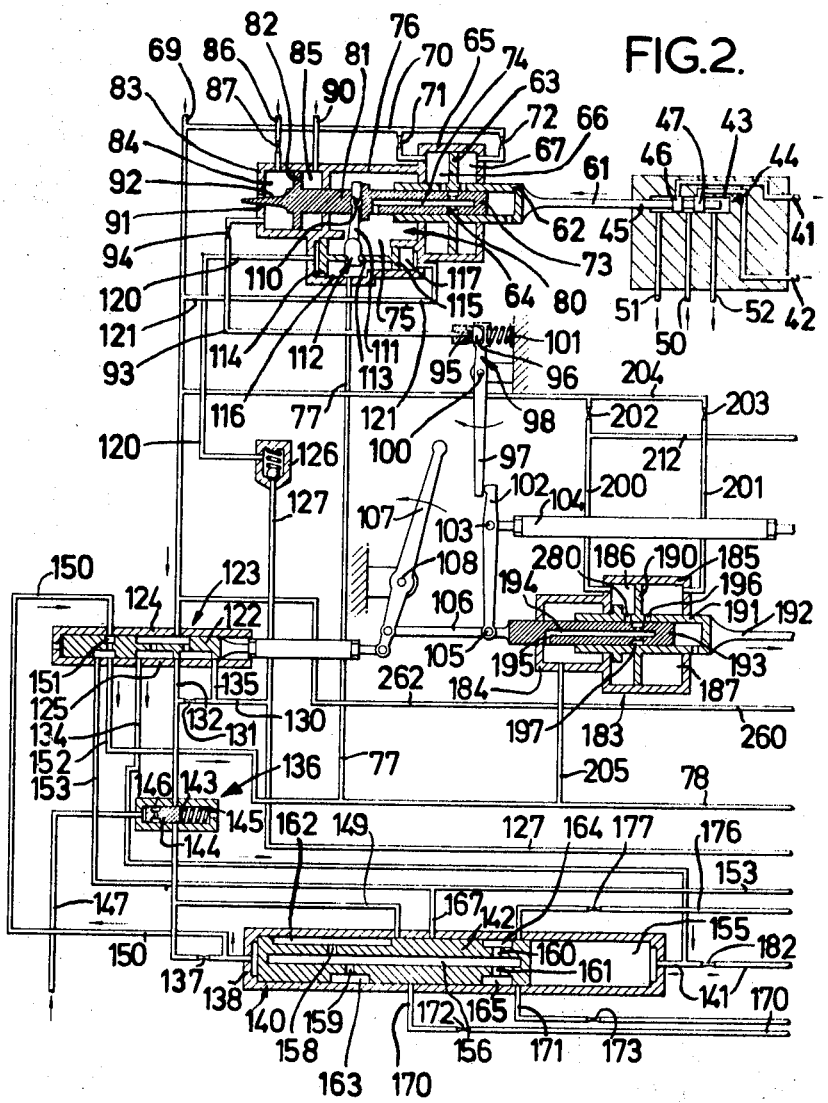

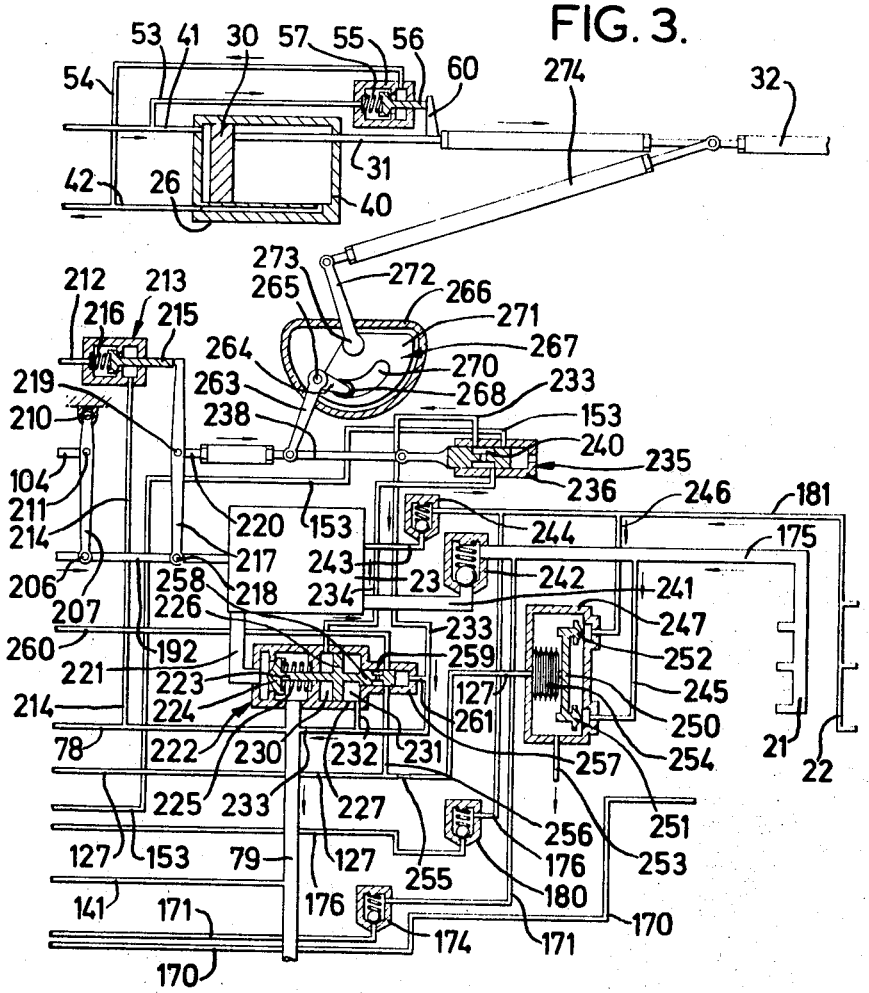

GAS TURBINE ENGINE

This invention concerns a gas turbine engine.

According to the present invention, there is provided a gas turbine engine having a jet pipe which is provided with reheat combustion equipment and with a variable area nozzle, a pressure-responsive device which controls the area of the nozzle during reheat operation of the engine and which is adjusted in functional dependence upon the value of the jet pipe pressure, fuel supply control means for controlling the supply of fuel to the reheat combustion equipment, a manually operable member for adjusting the quantity of fuel supplied by the fuel supply control means, and biassing means, operated on adjustment of the manually operable member to select or increase reheat, for biassing the pressure-responsive device so that the latter initially adjusts the area of the nozzle at a rate at least sufficient to prevent an appreciable rise of jet pipe pressure.

A priming device is preferably provided for priming the reheat combustion equipment with a supply of priming fuel prior to the reheat combustion equipment being provided with the main supply of fuel from the fuel supply control means.

The priming device, after supplying the priming fuel to the reheat combustion equipment, but before the latter is supplied with the main supply of fuel, may supply fuel to an ignition device.

The priming device may comprise a valve member which is movable at a controlled rate in a valve body between two terminal positions, and which, in the course of said movement, passes through intermediate positions in which it establishes communication between a fuel inlet pipe and fuel outlet pipes leading at least to the reheat combustion equipment and to the ignition device, means, associated with the manually operable member, being provided for moving the valve member into one or other of the two terminal positions in dependence upon whether of not reheat operation is selected.

The pressure-responsive device may comprise a pressure-responsive member which divides a chamber into two spaces, means being provided for supplying the said spaces with pressure fluids whose pressures are respectively functionally related to the jet pipe pressure and to a pressure prevailing in a compressor of the engine.

The biassing means may reduce the pressure which is functionally related to the pressure prevailing in a compressor of the engine.

The space which is supplied with a pressure fluid whose pressure is functionally related to the pressure prevailing in a compressor of the engine may communicate with a passage which is adapted to be vented by way of a normally closed valve the biassing means opening the said valve when the manually operable member is adjusted to select or increase reheat.

Locking means may be provided for locking the pressure-responsive member in a predetermined position whenever reheat operation is not being employed. Thus, the locking means may comprise a pressure-responsive device which is movable between a locked and an unlocked position in dependence upon the value of a fluid pressure, or a fluid pressure ratio, applied thereto, means associated with the manually operable member being provided for adjusting the said fluid pressure, or fluid pressure ratio, on movement of the manually operable member.

Preferably there are nozzle area sensing means for sensing the area of the nozzle and for adjusting the fuel supply control means, of the quantity of fuel supplied by the fluid supply control means instantaneously exceeds a given value which is appropriate to the instantaneous area of the nozzle.

There is preferably a connection between the fuel supply control means and the biassing means such that once the biassing means has biassed the pressure-responsive device it will continue to do so until the quantity of fuel supplied by the fuel supply control means has almost reached its selected value.

A shutoff cock may be provided which, when closed, prevents fuel from being supplied via the fuel supply control means to the reheat combustion equipment, control means being provided for maintaining the shutoff cock closed except when reheat operation is occurring.

The control means may include an operating valve which controls a fluid pressure supply to the shutoff cock, the operating valve being positioned by the nozzle area sensing means. Thus one of the said fuel outlet pipes may lead to the operating valve to supply the latter with the said fluid pressure supply.

The manually operable member may be connected to the fuel supply control means by way of a servo device, the nozzle-area-sensing means preventing operation of the servo device whenever the quantity of fuel supplied by the fuel supply control means exceeds the said given value.

The servo device may comprise a pressure-responsive member which divides a chamber into two spaces, means for supplying pressure fluid to each of the last-mentioned spaces, means for adjusting the relative pressures in the last-mentioned spaces whenever the manually operable member is moved so as to effect corresponding movement of the last-mentioned pressure-responsive member and means, adjustable by the nozzle area sensing means, for altering the pressure in one only of the last-mentioned spaces so as to stop movement of the last-mentioned pressure-responsive member, whenever the quantity of fuel supplied by the fuel supply control means exceeds the said given value corresponding to nozzle position.

Conduit means may also be provided whereby fuel purged from the reheat combustion equipment may pass to a drain, flow through the conduit means being controlled by valve means which are respectively closed and opened whenever reheat operation is, and is not, being employed.

The invention is illustrated, merely by way of example, in the accompanying drawings, in which:

FIG. 1 is a diagrammatic view of a gas turbine engine according to the present invention, and FIG. 2 and 3 are diagrammatic sectional views of adjacent parts of the structure of the engine of FIG. 1, the parts of the said structure being shown in the positions adopted when reheat in not being employed.

The terms "left" and "right," as used in the description below, are to be understood to refer to directions as seen in the drawings.

In FIG. 1 there is shown a gas turbine engine 10 which is adapted for use as a forward propulsion engine of an aircraft and which comprises in flow series a low-pressure compressor 11, a high-pressure compressor 12, main combustion equipment 13, a high-pressure turbine 14, a low-pressure turbine 15 and a jet pipe 16. Reheat combustion equipment 20 is mounted in the jet pipe 16 and includes main burners 21 and pilot burners 22, the burners 21, 22 being supplied with reheat fuel from a reheat fuel supply control unit and pump 23. The reheat fuel supply control unit and pump 23 may control the supply of reheat fuel in accordance with a number of engine variables.

Fuel may also be supplied, from the reheat fuel supply control unit and pump 23, through a line 24 to an ignition device 25 which may, for example, be constituted by "hot streak" injectors. Fuel supplied to these hot streak injectors passes through the main combustion equipment 13 and thence through the turbines 14, 15 as a "hot streak" to ignite reheat fuel supplied to the pilot burners 22. Alternatively, the line 24 may be adapted to supply fuel to a catalytic igniter (not shown) which initiates combustion, of such fuel.

A plurality of fluid power operated double-acting nozzle adjustment rams 26 are mounted about the jet pipe 16. Thus, there may, for example be six such rams 26, although in order to simplify the drawings, only one such ram is shown therein. The operation of this particular ram 26 will therefore be described, it being understood that the operation of the remaining rams 26 is identical.

The ram 26 has a piston 30 (FIG. 3) whose piston rod 31 is connected to an axially movable sleeve 32 which is mounted concentrically about the downstream end of the jet pipe 16. The sleeve 32 has a frustoconical downstream end 33 which tapers in a downstream direction. The downstream end of the jet pipe 16 is provided with a plurality of pivotally mounted nozzle members or "fingers" 34 which collectively constitute a variable area nozzle 35. Each of the nozzle members 34 is provided with a roller 36 which engages the internal surface of the downstream end 33 of the sleeve 32.

When the ram 26 causes axial movement of the sleeve 32 in a downstream direction, the nozzle members 34 will be able to move radially outwardly under the pressure of the exhaust gases in the jet pipe 16 so as to increase the effective area of the nozzle 35, and thus to "open" it, while axial movement of the sleeve 32 in an upstream direction will force the nozzle members 34 radially inwardly by a camming action of the sleeve 32 on the rollers 36, so as to decrease the effective area of the nozzle 35, and thus to "close" it.

The piston 30 of the ram 26 is slidable within a cylinder 40 opposite ends of which communicate by way of pipes 41, 42 with the interior of a cylindrical valve body 43 of a nozzle control valve 44. Slidably mounted within the valve body 43 is a spool valve 45 having lands 46, 47. When the spool valve 45 is moved in either direction away from the central position shown in FIG. 2, high-pressure fuel which may enter the valve body 43 through a pipe 50 may pass to one of the pipes 41, 42. The other of the pipes 41, 42 will at this time communicate with either a pipe 51 or a pipe 52 leading to drain (i.e. to a source of low-pressure fuel). Thus, whenever the spool valve 45 is away from the said central position, the piston 30 is moved.

If desired, the nozzle control valve 44 may be replaced by a nozzle control pump (not shown).

The pipes 41, 42 are interconnected by a bypass conduit which bypass the ram 26, the bypass conduit being constituted by conduits 53, 54 which respectively communicate with the pipes 41, 42 and which communicate with each other by way of a trip valve 55. The trip valve 55 has a valve member 56 which is urged towards a closed position by a spring 57. The valve member 56, however, is adapted to be opened on appropriate leftward movement of an arm 60 whenever the nozzle 35 is nearly "closed." The arm 60 is arranged to engage the valve member 56 and extends from the piston rod 31.

The spool valve 45 is mounted at one end of a rod 61 whose other end is formed integrally with a cylinder 62 which carries a double-acting slave piston 63 which forms part of a pressure ratio control device 64. The slave piston 63 is mounted for axial sliding movement in a cylinder 65, opposite faces of the slave piston 63 being of equal area and dividing the cylinder 65 into spaces 66, 67. High pressure fuel from a conduit 69 is supplied to a line 70 and thence is supplied via respective feed restrictors 71, 72 to the spaces 66, 67. The conduit 69 receives fuel from the high-pressure side of a fuel pump (not shown) which is driven by the engine 10 and which supplies fuel to the main combustion equipment 13.

Mounted for axial sliding movement in the cylinder 62 is a stem 73 having an axially extending passage 74 therein. The left-hand end of the passage 74 communicates at all times with a space 75 within a casing 76. The space 75 is connected by a pipe 77 to a pipe 78, the pipe 78 leading to a low-pressure fuel passage 79 which also supplies fuel to the reheat fuel supply control unit and pump 23.

The stem 73 has a diametrically extending passage 80 therethrough which intersects the axially extending passage 74. When the stem 73 is positioned as shown in FIG. 2, the diametrically extending passage 80 is covered by the slave piston 63. If, however, the stem 73 is moved to either the left or the right of the position shown, the diametrically extending passage 80 communicates, as the case may be, with either the space 66 or the space 67 and thus connects the respective space to the low-pressure fuel passage 79. When this occurs, the slave piston 63 will move in the same direction as the stem 73 has been moved, and this movement of the slave piston 63 will continue until it once again covers the diametrically extending passage 80. Thus movement of the stem 73 in a given direction causes equal movement of the slave piston 63 in the same direction.

The stem 73 is connected to a rod 81 which carries a double-acting master piston 82, the master piston 82 being mounted for axial sliding movement in a chamber 83. The master piston 82 has opposite faces of substantially equal area which divide the interior of the chamber 83 into spaces 84, 85. The space 84 is supplied with compressed air from a conduit 86, containing a restriction 87, the compressed air in the space 84 being at a pressure equal to, or functionally related to, the delivery pressure $P_3$ of the high pressure compressor 12 of the engine 10. The space 85 is supplied via a conduit 90 with gas at a pressure equal to, or functionally related to, the pressure $P_6$ prevailing in the jet pipe 16 of the engine 10. Thus, the master piston 82 is adjusted in functional dependence upon the value of the jet pipe pressure; that is to say, it is adjusted in accordance with the ratio $P_3/P_6$.

The space 84 is vented to atmosphere through an opening 91 in the wall of the chamber 83. A frustoconical needle 92, which extends from the rod 81, extends through the opening 91 so as to partly to obturate the latter.

As will be appreciated, axial movement of the master piston 82 causes like movement of the stem 73 and hence causes one or other of the spaces 66, 67 to be brought into communication with the space 75 and hence with the low-pressure fuel passage 79. This causes the pressure in the respective space 66 or 67 to fall relative to that in the other space, and thus causes the slave piston 63 to move accordingly. The slave piston 63 therefore follows the movement of the master piston 82.

The slave piston 63 is thus, as will be appreciated, a servo piston whose position is exactly dictated by the master piston 82, the position of the master piston 82 being in turn dictated by the value of the ratio $P_3/P_6$. Thus, whenever the slave piston 63 is operative to move the rod 61 and hence the spool valve 45, the area of the nozzle 35 will be adjusted to functional dependence upon the value of the ratio $P_3/P_6$. In effect the master piston 82 acts as a sensing piston and moves axially in response to changes in the ratio between the jet pipe pressure $P_6$ and a datum pressure, in this case the compressor delivery pressure $P_3$.

The arrangement will be seen to be such that should the jet pipe pressure $P_6$ increase, as a result of reheat being selected, the master piston 82 will (unless prevented from moving, by the means described below) move to the left, causing the slave piston 63 to move to the left also. As the master piston 82 moves to the left in its chamber 83, the restriction provided by the needle 92 increases, thereby increasing the pressure in the space 84 in opposition of the movement of the piston 82 and providing, in effect, a negative positioned feedback.

The space 84 communicates with one end of a passage 93 which contains a restriction 94. The other end 95 of the passage 93 is normally closed by a half-ball member 96 which is mounted at one end of a lever 97 forming part of a pressure ratio control bias valve 98. The lever 97 is pivotally mounted about a fixed fulcrum 100 and is biased by a spring 101 towards the position in which the half-ball member 96 seats against the end 95 of the passage 93.

The end of the lever 97 remote from the half-ball member 96 is engageable by one end of a lever 102. The lever 102 is connected at a pivot 103 to a link 104, the other end of the lever 102 being pivotally connected at 105 to a rod 106 which is itself pivotally connected to a pilot's throttle lever 107. Thus, as the pilot's throttle lever 107 is moved about its fulcrum 108 in a counterclockwise direction, the lever 102 will move the lever 97 clockwise so as to open and thus vent, the end 95 of the passage 93. This movement occurs when reheat is selected or rapidly increased and thus before the jet pipe pressure $P_6$ has risen as a result of the light up or the increased fuel supply, and, as will be appreciated, has the effect of reducing the pressure in the space 84, and thus enabling the master piston 82 to travel in a leftward direction before the jet pipe pressure $P_6$ has risen so as to cater for normal selection or "slam" increase of reheat. Accordingly, the pressure ratio control device 64 will be biased in such a way that it initially effects adjustment of the area of the nozzle 35 at a rate sufficient to prevent an appreciable rise of the jet pipe pressure $P_6$.

The pressure balance bias valve 98 has the effect of altering the datum of the pressure ratio control 64 before the fuel flow increases as a result of the selection or rapid increase of reheat. As will be clear from the description below, this biasing occurs rapidly but progressively for a small error between the selected and the achieved degree of reheat, and then reaches a limit.

The rod 81 of the pressure ratio control 64 has a pair of diametrically spaced apart pins 110 which are received within a yoke 111 which forms part of a pressure ratio control lock 112, the pressure ratio control lock 112 ensuring that the rod 81 is locked in a predetermined position whenever reheat operation is not being employed. The yoke 111 is carried by a rod 113 opposite ends of which are provided with pistons 114, 115. The pistons 114, 115 are respectively axially slidable in cylinders 116, 117 which are themselves respectively adapted to be supplied with pressure fluid by way of pipes 120, 121. As will be seen from FIG. 2, the surface area of the piston 114 open to the pressure from the pipe 120 is substantially greater than that of the piston 115 open to the pressure in the pipe 121.

The pipe 121 is open at all times to the conduit 69. The pipe 120, however, is only open to a fluid pressure supply when a valve member 122 of a reheat selection valve 123 is in a predetermined position, the valve member 122 being connected to the pilot's throttle lever 107 for movement by the latter.

The valve member 122 is axially slidable in a valve body 124, the valve body 124 having a bore 125 which communicates at all times with the fuel conduit 69.

The pipe 120 communicates by way of a nonreturn valve 126 with a pipe 127 which itself communicates with a passage 130. The passage 130, which contains a restriction 131, communicates with a passage 132 leading to the bore 125. As will be seen, in the FIG. 2 position the high pressure fuel from the conduit 69 cannot pass to the passage 132 and is not therefore, in this position, used to pressurize the piston 114. In this position of the parts therefore, the pressure ratio control lock 112 prevents the master piston 82 from moving in response to changes in the pressure $P_3/P_6$.

The valve member 122 of the reheat selection valve 123 has passages therethrough which permit communication between the conduit 69 and either a duct 134 of a duct 135, the duct 135 leading to the passage 130.

The passage 132 communicates, by way of a valve 136 and a restriction 137 with the left-hand end of the interior of a valve body 138 forming part of an hydraulic priming device 140 which is provided for priming the burners 21, 22, with a supply of priming fuel prior to the burners 21, 22 being provided with the main supply of fuel thereto from the reheat fuel supply unit and pump 23. The opposite end of the valve body 138 communicates with a pipe 141 which itself communicates with the duct 134.

Mounted for axial sliding movement within the valve body 138 is a valve member 142 which, as shown, is moved within the valve body 138 extending two terminal positions purely by virtue of the hydraulic forces acting on the opposite ends thereof, although it is possible, if desired, to bias the valve member 80 towards the left by means of a spring (not shown). As will be clear from the description below, the said hydraulic forces are such that the valve member 142 is moved at a controlled rate to one or the other of the two terminal positions in dependence upon whether or not reheat operation is selected.

The valve 136 has a valve body 143 with a valve member 144 slidably mounted therein, the valve member 144 being urged towards the left by a spring 145. The valve member 144, however, which has a diametrically extending passage 146 therethrough, is open to the pressure in a pipe 147. The arrangement is such that when the engine 10 is running at or above, say, 80 percent of its rated rotational speed, the pressure in the pipe 147 is caused (by speed-responsive means, not shown) to be sufficient to move the valve member 144 towards the right so as to permit any high-pressure fuel supplied to the passage 132 to be supplied to the left-hand end of the cylinder 138 and to a fuel inlet pipe 149 which communicates with the passage 132.

The passage 132, downstream of the restriction 137 communicates with a pipe 150 which extends to the valve body 124 of the reheat selection valve 123. The valve member 122 of the latter has a passage 151 therein which permits communication between the pipe 150 and pipes 152, 153, the pipe 152 communicating with the pipe 78 which leads to the low-pressure fuel passage 79.

The valve member 142, when in the FIG. 2 position, defines with the right-hand end of the cylinder 138 a space 155 which communicates with the pipe 141. The valve member 142, moreover, has an axially extending passage 156 therein which communicates with radially extending passages 158, 159, 160, 161 leading to grooves 162, 163, 164, 165, respectively, in the valve member 142.

The passage 132, on the downstream side of the valve 136 communicates with the said fuel inlet pipe 149 which in certain positions of the valve member 142, communicates with the groove 162. The pipe 153 communicates with a pipe 167, the groove 162 being adapted, in certain positions, to effect intercommunication between the pipes 149, 167.

The grooves 163, 165 are adapted, when the valve member 142 is appropriately positioned, to communicate respectively with fuel outlet pipes 170, 171. The pipe 170, which has a restriction 172 therein, communicates (by means not shown) with the line 24 extending to the hot streak injectors or alternatively communicates with a catalytic igniter (not shown) forming part of the reheat combustion equipment 20. The pipe 171, which has a restriction 173 therein, extends via a nonreturn valve 174 to a duct 175 leading to the main burners 21. The groove 164 is adapted to communicate with a fuel outlet pipe 176 which contains a restriction 177 and which extends by way of a nonreturn valve 180 to a duct 181 which leads to the pilot burners 22. Thus as the valve member 142 moves from the terminal position thereof shown in FIG. 2 to that (not shown) in which it is at the opposite end of the valve body 138, it will pass through intermediate positions in which it establishes communication between the pipe 149 and the pipes 170, 171, 176.

The pipe 141 communicates by way of a restriction 182 with the low-pressure fuel passage 79.

A throttle servo 183 has chambers 184, 185 of which the chamber 185 is divided into spaces 186, 187 by a piston 190. The piston 190 is formed integrally with a cylindrical member 191 which is provided at one end of a rod 192. Slidably mounted within the cylindrical member 191 is a stem 193 which has an axially extending passage 194 therein, the stem 193 being connected by the rod 106 to the pilot's throttle lever 107. The axially extending passage 194 communicates, by way of a radial drilling 280 with the space within the chamber 184. The cylindrical member 191 has drillings 280, 196 which communicate respectively with the spaces 186, 187 and which may also communicate, when the stem 193 is moved appropriately, with a diametrically extending passage 197 which intersects and thus communicates with, the axially extending passage 194.

The spaces 186, 187 respectively communicate with pipes 200, 201 which have restrictions 202, 203 respectively therein and which both communicate with a common pipe 204 which extends to the conduit 69 whereby to obtain a high-pressure fuel supply from the latter.

The space within the chamber 184 is connected to the low-pressure fuel passage 79 by a passage 205 which communicates with the pipe 78 and hence with the passage 79. It will thus be appreciated that any movement of the pilot's throttle lever 107 will move the stem 193 and will therefore produce like movement of the piston 190 by reason of the fact that one or other of the spaces 186, 187 will be connected to low pressure.

Accordingly, when the pilot's throttle lever 107 is moved counterclockwise, the piston 190 will also be moved rightwards, and like movement will therefore occur of the rod 192.

The rod 192 is pivotally connected at 206 to a lever 207 which is mounted on a sliding pivot 210. The lever 207 is pivotally connected at 211 to the link 104. As will therefore be appreciated, when the pilot's throttle lever 107 is moved counterclockwise, this will initially cause counterclockwise movement of the lever 102 and therefore venting of the passage 93. At the same time, however, there will be rightward travel of the stem 193 and hence (subject to the effect of the throttle servo bleed valve 213 discussed below) a controlled rate of movement of the piston 190 and pivot 206. This will produce like rightward movement of the pivot 211 and therefore of the pivot 103 whereby to remove the lever 102 from engagement with the lever 97 and hence to permit the end 95 to the duct 93 to be sealed once again by the half-ball member 96.

The pipe 200 communicates with a pipe 212 which itself communicates via a throttle servo bleed valve 213 with a pipe 214 which extends to the pipe 78 and hence to the low-pressure fuel passage 79. Thus, whenever the throttle servo bleed valve 213 is open, the pressure in the space 186 will be reduced.

The throttle servo bleed valve 213 is provided with a valve member 215 which is urged by a spring 216 towards a seated position. The valve member 215 is, however, engageable by a lever 217 which is pivotally connected at 218 to the rod 192. The lever 217 is also pivotally connected at 219 to a rod 220 which is connected (by means described below) to the nozzle 35. The arrangement is such that the throttle servo bleed valve 213 will be open if the fuel supply exceeds a given value which is appropriate to the instantaneous area of the nozzle 35, the fuel supply being prevented from increasing further until the nozzle area has increased.

The rod 192 adjusts the position of a metering valve (not shown) forming part of the reheat fuel supply control unit and pump 23, whereby adjustment of the pilot's throttle lever 107 adjusts the fuel supplied by the reheat fuel supply control unit and pump 23.

The reheat fuel supply control unit and pump 23 communicates with a duct 221 which itself communicates with the low-pressure fuel passage 79 by way of a reheat shutoff cock 222. The shutoff cock 222 is arranged to remain closed when reheat is selected, until the priming of the burners 21, 22 is complete and the area of the nozzle 35 has been somewhat increased. The shutoff cock 222 has a valve member 223 which is provided with a valve head 224, the latter being urged by a spring 225 towards the seated position. In this position it prevents flow from the low-pressure fuel passage 79 to the duct 221. The valve member 223 is also provided with a piston 226 which is slidably mounted in a cylinder 227, the piston 226 dividing the cylinder 227 into spaces 230, 231. The space 231 communicates, by way of a passage 232, with the fuel passage 79. The space 230 communicates with a passage 234 which communicates with the interior of a shutoff cock operating valve 235. Slidably mounted in the body 236 of the shutoff cock operating valve 235 is a valve member 237, the latter being connected by way of a rod 238 to the rod 220 and so to the lever 217. The valve member 237 has a passage 240 extending diametrically therethrough which, in the position shown in FIG. 3, permits communication between the passage 234 and the passage 233. The shutoff cock operating valve 235 serves to ensure that, except when reheat operation is required, and all the other parts described above are in a position to permit it, the shutoff cock 222 is closed so as to prevent fuel from being supplied via the reheat fuel supply control unit and pump 23 to the burners 21, 22.

The pipe 153 also extends to the body of the shutoff cock operating valve 235 so that in one position (not shown) of the valve member 237 communication is possible between the passage 234 and the pipe 153.

The reheat fuel supply control unit and pump 23 supplies main fuel to a main fuel duct 241 which communicates, by way of a nonreturn valve 242 with the duct 175 leading to the main burners 21. The reheat fuel supply control unit and pump 23 also communicates, by way of a pilot duct 243, and thus by way of a nonreturn valve 244 with the duct 181 which leads to the pilot burners 22.

The ducts 175, 181 respectively communicate, by way of passages 245, 246, with the interior of a purge chamber 247 which may be of any convenient shape. A valve member 250 is provided with valves 251, 252 for respectively sealing the ends of the passages 245, 246. The interior of the chamber 247 communicates by way of a passage 253 with a drain.

The valve member 250 is carried by a bellows 254 which is open to the pressure in the pipe 127, the latter incorporating a safety restrictor 255. The arrangement is such that the valves 251, 252 are open except when the bellows 254 is supplied with pressure fluid.

The pipe 127, immediately upstream of the safety restrictor 255, communicates with a passage 256 which itself communicates with the internal surface of a cylinder 257. A valve member 258, which is connected to the valve member 223, is slidably mounted in the cylinder 257 and has a diametrically extending passage 259 therein which, when the valve member 258 is suitably positioned, establishes communication between the passage 256 and a passage 260 which extends to the conduit 69. The right-hand face of the valve member 258 is open, via a passage 261, and passage 233 to low pressure.

The rod 238 is pivotally connected to one arm 263 of a bellcrank lever 263, 264, the bellcrank lever 263, 264 being pivotally mounted at 265 within a housing 266 of a nozzle area sensing device 267. The arm 264 of the bellcrank lever 263, 264 carries at its outer end a roller 268 which is movable along a cam track 270 provided on a cam 271. The cam 271 is mounted at one end of an arm 272, the cam 271 and arm 272 being mounted for angular movement about a pivot axis 273. Thus angular movement of the arm 272, consequent upon opening or closing of the nozzle 35, effects like movement of the cam 271, the arm 272 being pivotally connected to a rod 274 which is in turn connected to the rod 31 and thence to the sleeve 32 and the nozzle 35. Thus the nozzle area sensing device 267 will position the shutoff cock operating valve 235.

As will be appreciated, the provision of the throttle servo bleed valve 213 prevents the throttle servo 183 from putting excessive loads on the nozzle ares sensing device 267.

If, in the period immediately following the selection of reheat, or of increased reheat, the quantity of fuel supplied by the reheat fuel supply control unit and pump 23 instantaneously exceeds a given value which is appropriate to the instantaneous area of the nozzle 35, the relative positions of the arm 263 and rod 192 will be such that the valve member 215 of the throttle servo bleed valve 213 will be moved off its seating. This will cause the pressure in the space 186 to fall to the same value as that in the space 187 and will therefore stop the piston 190 (and hence the reheat fuel supply control unit and pump 23) from being adjusted to the position dictated by the position of the pilot's throttle lever 107 until the nozzle 35 has opened sufficiently to allow the valve member 215 to close.

It will be noted that the lever 102 (and hence the pressure balance ratio control bias valve 98) is connected to the arm 263 by way of the link 104, lever 207, rod 192, lever 217 and rod 238. The arrangement is such that once the pressure balance ratio control bias valve 98 has moved so as to bias the operation of the pressure ratio control device 64, it will continue to do so until the quantity of fuel supplied by the reheat fuel control unit and pump 23 has almost reached the selected value.

In FIGS. 2 and 3 the parts are shown in the positions adopted when reheat is not being employed. In this condition, the pilot's throttle lever 107 will be positioned as shown in FIG. 2, and the pressure balance bias valve 98 and throttle servo bleed valve 213 will be closed, while the nozzle 35 will be in its minimum area position. As a result, the valve member 237 of the shutoff cock operating valve 235 will prevent communication between the pipe 153 and the passage 234, while the valve members 122 and 142 of the reheat selection valve 123 and of the hydraulic priming device 140 respectively will prevent high-pressure fuel from being supplied to the pipe 167 and so to the pipe 153. Such high-pressure fuel cannot therefore be supplied through the passage 234 to the space 230, and therefore cannot act on the piston 226 of the reheat shutoff cock 222. The valve member 223 of the latter will therefore be closed by the spring 225 and no fuel will be supplied to the reheat fuel supply control unit pump 23.

In the FIG. 2 position, moreover, the valve member 142 of the hydraulic priming device 140 will be at the leftward end of its travel, so that there will be no priming flows to the pipes 170, 171, 176.

Additionally, in the FIG. 2 position, the valve member 122 prevents high-pressure fuel from being supplied to either the passage 132 or the duct 135 and thus prevents this fuel from acting on the piston 144. The piston 115 will, however, be open, via the pipe 121 and conduit 69, to such high-pressure fuel. As a result, the pressure ratio control lock 112 will lock rod 81 and master piston 82 in the position shown, and will therefore lock the nozzle 35 in the minimum area position. This in turn will open the trip valve 55 and so will relieve pressure on the ram 26. The trip valve 55 is thus provided to relieve the full closing pressure which would otherwise be exerted on the ram 26 when the nozzle 35 is in the minimum area position.

Moreover, since at this time there will be no high-pressure fuel to either the passage 132 or to the duct 135, there will be no pressure fluid supply to the pipe 127 and hence to the bellows 254. The valves 251, 252 will therefore be open, i.e. spaced from their seats, and any fuel in the main burners 21 and pilot burners 22 may therefore be purged to drain.

It will also be noted that, in FIG. 2 position, the left-hand end of the cylinder 138 of the hydraulic priming device 140 will be open to low-pressure via the pipe 150, the passage 151, the pipes 152 and 78, and the low-pressure fuel passage 79. It will further be noted that, in the FIG. 2 position, the high-pressure fuel supplied to the conduit 69 will pass to the duct 134 and hence, via the pipe 141, to the right-hand end of the cylinder 138 of the hydraulic priming device 140 and also via the restriction 182 to the low-pressure fuel passage 79. Thus the valve member 142 will be forced to the left.

If now the pilot wishes to select the minimum degree of reheat, he moves the pilot's throttle lever 107 counterclockwise through a small angle, thereby moving the valve member 122 of the reheat selection valve 123 towards the right and into a position in which the conduit 69 communicates with the passage 132 and the duct 135. The pipe 127, and hence the bellows 254, will therefore receive high-pressure fuel and the valves 251, 252 will close.

Since fuel will, at this time, be supplied to the duct 135 and hence to the passage 130 and pipes 127 and 120, the piston 114 will be moved to release the pressure ratio control lock 112. The movement of the pilot's throttle lever 107 will cause the lever 102 to move the lever 97 and hence to open the end 95 of the passage 93. The pressure in the space 84 will therefore swiftly fall, the master piston 82 will move towards the left, the nozzle 35 will start to open and the trip valve 55 will close. The opening of the nozzle 35 will, via the nozzle area sensing device 267 cause the valve member 237 to be moved to a position in which once fuel is supplied to the pipe 167, and hence to the pipe 153, will pass to the space 230 and effect opening of the shutoff cock 222.

At the same time, the fuel in the passage 132 (assuming the valve 136 is open) will be applied to the left-hand end of the valve member 142 of the hydraulic priming device 140 and the valve member 142 will therefore move rightwards. During a part of the rightward travel of the valve member 142 fuel will be supplied via the pipe 149, groove 162, radially extending passage 158, and axially extending passage 156 to the piped 171, 176 so as to prime the main and pilot burners. Furthermore, during subsequent parts of this rightward travel of the valve member 142 fuel will be supplied first to the pipe 167 for the opening of the shutoff cock 222, and then, via the axially extending passage 156, radially extending passage 159, groove 163 and pipe 170 to the hot streak injectors or the catalytic igniter, whereby to effect ignition of this priming fuel. All this will occur immediately before fuel is supplied to the burners 21, 22 from the reheat fuel supply control unit and pump 23.

The movement of the pilot's throttle lever 107 will also move the stem 193, and hence the piston 190, towards the right and therefore, after a small initial movement, start to adjust the metering valve in the reheat fuel supply control unit and pump 23. Fuel will be supplied from the reheat fuel supply control unit and pump 23 to the burners 21, 22, and on ignition, the burning of this reheat fuel will in turn increase the value of the pressure $P_6$ and hence adjust the master piston 82 and nozzle 35 further.

After the piston 190 and rod 192 has moved a small distance towards the right in order to follow the rightward movement of the stem 193, the throttle servo bleed valve 213 will be opened by the lever 217, and this will equalize the pressures in the spaces 186, 187 and hence will temporarily prevent further rightward movement of the piston 190. The altered position of the nozzle 35 will, however, be sensed by the nozzle position feedback cam device 267 which will cause the throttle servo bleed valve 213 to half close, whereby to produce further rightward movement of the piston 190 and hence an increased fuel supply.

This will produce controlled movement of the piston 190, and hence of the fuel increase, until the nozzle 35 has nearly been opened to the required extent. When this happens, the throttle servo bleed valve will close and the piston 190 will move until it covers the passage 197. The lever 102 will then no longer cause the half-ball member 96 to be spaced from the end 95, and the master piston 82 can thereafter move in response to variations in the pressure ratio $P_3/P_6$.

If now the pilot wishes to cease to employ reheat, he moves the pilot's throttle lever 107 clockwise so as to restore the valve member 122 and the stem 193 to the positions shown in FIG. 2. As a result, the left-hand end of the cylinder 138 will be connected to low pressure via the pipe 150, the passage 151, the pipes 152 and 78, and the low-pressure fuel passage 79, while the right-hand end of the cylinder 138 will receive high-pressure fuel via the duct 134 and pipe 141. The valve member 142 will therefore be forced hydraulically toward the leftward limit of its travel, forcing fuel out through the pipe 150 to low pressure.

The movement of the pilot's throttle lever 107 clockwise will also cause virtually immediate leftward movement of the piston 190, whereby reheat fuel flow is reduced to a minimum.

Fuel will no longer, however, be supplied to the pipe 167 and hence therefrom to the pipe 153, with the result that the pressure in the space 230 will fall and the shutoff cock 222 will close, so that the fuel flow to the burners will cease. Fuel forced out through the passage 234 by the consequential leftward travel of the piston 226 will initially pass to low pressure via the pipes 153, 152 and 78.

The jet pipe pressure $P_6$ will then fall, the master piston 82 will move towards the right, and the nozzle 35 will move towards its minimum area position.

If the pilot increases the reheat fuel supply from nil to a maximum the operation is generally similar to that described above in connection with the selection of minimum reheat. However, in this case, when the nozzle 35 has opened to the degree appropriate to the selection of minimum reheat, the throttle servo bleed valve 213 will remain open and then will gradually close, causing the throttle servo 183 and the reheat fuel supply control unit and pump 23 to increase the fuel flow. The pressure ratio control 64 will sense the further rise in the pressure $P_6$, the nozzle 35 will open further, the throttle servo 183 will yet further increase the fuel flow, and this will continue until maximum reheat has been achieved.

I claim:

1. A gas turbine engine having a jet pipe which is provided with reheat combustion equipment and with a variable area nozzle, a pressure-responsive device which controls the ares of the nozzle during reheat operation of the engine and which is adjusted in functional dependence upon the value of the jet pipe pressure, fuel supply control means for controlling the supply of fuel to the reheat combustion equipment nozzle-area-sensing means for sensing the area of the nozzle and for adjusting the fuel supply control means if the quantity of fuel supplied by the fuel supply control means instantaneously exceeds a given value which is appropriate to the instantaneous area of the nozzle, a manually operable member for adjusting the quantity of fuel supplied by the fuel supply control means, and biassing means, operated on adjustment of the manually operable member to select and increase reheat, for biasing the pressure-responsive device so that the latter initially adjusts the area of the nozzle at a rate which prevents an appreciable rise of jet pipe pressure.

2. An engine as claimed in claim 1 in which a priming device is provided which comprises a valve member which is movable at a controlled rate in a valve body between two terminal positions, and which, in the course of said movement, passes through intermediate positions in which it establishes communication between a fuel inlet pipe and fuel outlet pipes leading at least to the reheat combustion equipment and to the ignition device, during said movement, the priming device priming the reheat combustion equipment with a supply of priming fuel prior to the reheat combustion equipment being provided with the main supply of fuel from the fuel supply control means and then, before the reheat combustion equipment is supplied with the main supply of fuel, supplying fuel to an ignition device, means associated with the manually operable member, being provided for moving the valve member into a selected one of the two terminal positions in dependence upon whether reheat operation is selected.

3. An engine as claimed in claim 1 in which the pressure-responsive device comprises a pressure-responsive member which divides a chamber into two spaces, means being provided for supplying the said spaces with pressure fluids whose pressures are respectively functionally related to the jet pipe pressure and to a pressure prevailing in a compressor of the engine, locking means being provided for locking the pressure-responsive member in a predetermined position whenever reheat operation is not being employed, the locking means comprising a pressure-responsive device which is movable between a locked and an unlocked position, in dependence upon the value of a fluid pressure, or a fluid pressure ratio, applied thereto, means associated with the manually operable member being provided for adjusting the said fluid pressure, or fluid pressure ratio, on movement of the manually operable member.

4. An engine as claimed in claim 1 wherein means for purging fuel from the combustion equipment is provided including conduit means which are controlled by a valve, the valve being closed and thus closing the conduit when reheat is being employed to prevent the purging of fuel from the combustion equipment, and open when reheat is not employed to permit fuel purged from the combustion equipment to be passed to drain through the conduit.

5. An engine as claimed in claim 1 in which there is a connection between the fuel supply control means and the biassing means such that once the biassing means have biased the pressure-responsive device it will continue to do so until the continue of fuel supplied by the fuel supply control means has almost reached its selected value.

6. An engine as claimed in claim 5 in which a shutoff cock is provided which, when closed, prevents fuel form being supplied via the fuel supply control means to the reheat combustion equipment, control means being provided for maintaining the shutoff cock closed except when reheat operation is occurring.

7. An engine as claimed in claim 6 in which the control means includes an operating valve which controls a fluid pressure supply to the shutoff cock, the operating valve being positioned by the nozzle-area-sensing means.

8. An engine as claimed in claim 7 in which one of the said fuel outlet pipes leads to the operating valve to supply the latter with the said fluid pressure supply.

9. An engine as claimed in claim 1 in which the manually operable member is connected to the fuel supply means by way of a servo device, the nozzle-area-sensing means preventing operation of the servo device whenever the quantity of fuel supplied by the fuel supply control means exceeds the said given value.

10. An engine as claimed in claim 9 in which the servo device comprises a pressure-responsive member which divides a chamber into two spaces, means for supplying pressure fluid to each of the last-mentioned spaces, means for adjusting the relative pressures in the last-mentioned spaces whenever the manually operable member is moved so as to effect corresponding movement of the last-mentioned pressure-responsive member, and means, adjustable by the nozzle-area-sensing means, for altering the pressure in one only of the last-mentioned spaces so as to stop movement of the last-mentioned pressure-responsive member whenever the quantity of fuel supplied by the fuel supply control means exceeds the said given value corresponding to the nozzle position.